United States Patent
Wang

(10) Patent No.: US 10,592,686 B2
(45) Date of Patent: Mar. 17, 2020

(54) DATA ISOLATION IN A BLOCKCHAIN NETWORK

(71) Applicant: Alibaba Group Holding Limited, George Town (KY)

(72) Inventor: Jiyuan Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/421,170

(22) Filed: May 23, 2019

(65) Prior Publication Data

US 2019/0286838 A1    Sep. 19, 2019

Related U.S. Application Data

(63) Continuation of application No. PCT/CN2018/122166, filed on Dec. 19, 2018.

(51) Int. Cl.
*H04L 29/06* (2006.01)
*G06F 21/62* (2013.01)
(Continued)

(52) U.S. Cl.
CPC .......... *G06F 21/6227* (2013.01); *G06F 21/00* (2013.01); *H04L 9/0643* (2013.01);
(Continued)

(58) Field of Classification Search
CPC combination set(s) only.
See application file for complete search history.

(56) References Cited

U.S. PATENT DOCUMENTS

2017/0230375 A1* 8/2017 Kurian .................. H04L 63/102
2017/0289111 A1  10/2017 Voell et al.
(Continued)

FOREIGN PATENT DOCUMENTS

| CN | 105488675 | 4/2016 |
|---|---|---|
| CN | 108154367 | 6/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Malcolm Cribbs
(74) *Attorney, Agent, or Firm* — Fish & Richardson P.C.

(57) ABSTRACT

Implementations of the present specification include receiving a request to perform a private transaction associated with at least one account; in response to receiving the request, performing, by a workflow node, the private transaction; in response to performing the private transaction, generating, by the workflow node, a representation of the private transaction configured to be accessible only to entities that are authorized to access the private transaction; storing, in a private blockchain, the representation of the private transaction; generating, by the workflow node, an account record for the at least one account associated with the private transaction based at least in part on the private transaction, wherein the account record is configured to be accessible to at least one entity that is not authorized to access the representation of the private transaction in the private blockchain; and storing, in a public blockchain, the account record.

27 Claims, 5 Drawing Sheets

(51) Int. Cl.
*H04L 9/06* (2006.01)
*H04L 9/32* (2006.01)
*G06F 21/00* (2013.01)

(52) U.S. Cl.
CPC .......... *H04L 9/3239* (2013.01); *H04L 9/3247* (2013.01); *H04L 2209/38* (2013.01); *H04L 2209/56* (2013.01)

(56) References Cited

U.S. PATENT DOCUMENTS

| | | |
|---|---|---|
| 2018/0068130 A1 | 3/2018 | Chan et al. |
| 2018/0103042 A1* | 4/2018 | Castagna ................ H04L 63/08 |
| 2018/0139186 A1* | 5/2018 | Castagna ............ H04L 63/0428 |
| 2018/0198624 A1* | 7/2018 | Bisti .................... H04L 9/3247 |
| 2018/0253539 A1* | 9/2018 | Minter .................... G06F 21/32 |
| 2018/0285839 A1* | 10/2018 | Yang ................. G06Q 20/0655 |
| 2019/0027237 A1* | 1/2019 | McFarlane ............. G16H 10/60 |
| 2019/0114626 A1* | 4/2019 | Pogorelik .......... G06Q 20/3674 |
| 2019/0130701 A1* | 5/2019 | Simons ............... G07F 17/3241 |

FOREIGN PATENT DOCUMENTS

| | | |
|---|---|---|
| CN | 108805568 | 11/2018 |
| CN | 108805656 | 11/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/122166, dated Jul. 15, 2019, 6 pages.

Extended European Search Report in European Application No. 18866463.5, dated Dec. 4, 2019, 6 pages.

* cited by examiner

DATA ISOLATION IN A BLOCKCHAIN NETWORK

CROSS-REFERENCE TO RELATED APPLICATIONS

This application is a continuation of PCT Application No. PCT/CN2018/122166, filed on Dec. 19, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

One common issue in blockchain networks is privacy protection, due to the inherent openness of the blockchain itself. Entries in a conventional blockchain are available for inspection by all participants in the blockchain network, which can present issues when the transactions managed in a blockchain network contain sensitive information.

SUMMARY

Implementations of the present specification include computer-implemented methods for data isolation in a blockchain network. More particularly, implementations of the present specification are directed to isolating private transaction details while publishing transaction summaries to a private blockchain and account balance updates to a public blockchain.

In some implementations, actions include receiving a request to perform a private transaction associated with at least one account; in response to receiving the request, performing, by a workflow node, the private transaction; in response to performing the private transaction, generating, by the workflow node, a representation of the private transaction configured to be accessible only to entities that are authorized to access the private transaction; storing, in a private blockchain, the representation of the private transaction; generating, by the workflow node, an account record for the at least one account associated with the private transaction based at least in part on the private transaction, wherein the account record is configured to be accessible to at least one entity that is not authorized to access the representation of the private transaction in the private blockchain; and storing, in a public blockchain, the account record.

Other implementations include corresponding systems, apparatus, and computer programs, configured to perform the actions of the methods, encoded on computer storage devices.

These and other implementations may each optionally include one or more of the following features:

In some cases, the workflow node stores the private transaction in a datastore of the workflow node, wherein the datastore is separate from the private blockchain, and generating the representation of the private transaction includes generating a hash value associated with the private transaction.

In some implementations, the workflow node maintains a local representation of the account record for the at least one account, performing the private transaction comprises modifying the local representation of the account record based on the private transaction, and the at least one account record includes a subset of information in the local representation of the account record.

In some cases, storing the account record in the public blockchain is performed responsive to storing the representation of the private transaction in the private blockchain.

In some implementations, other representations of private transactions for which no corresponding storage of an account to the public blockchain is performed are stored to the private blockchain.

In some cases, an encrypted copy of the private transaction that has been encrypted with a public key of a public/private keypair is stored in a datastore separate from the private blockchain.

In some implementations, storing the encrypted copy of the private transaction includes storing a signature of the encrypted copy that has been created with a private key of the public/private keypair.

In some implementations, the private blockchain is a first private blockchain, the private transaction is a first private transaction, and the method further comprises: storing, in a second private blockchain separate from the first private blockchain, a representation of a second private transaction different from the first private transaction; and storing, in the public blockchain, an account record for an account associated with the second private transaction.

In some cases, the account record includes a balance of the at least one account and the account record does not include information about the associated private transaction.

The present specification also provides one or more non-transitory computer-readable storage media coupled to one or more processors and having instructions stored thereon which, when executed by the one or more processors, cause the one or more processors to perform operations in accordance with implementations of the methods provided herein.

The present specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the

DESCRIPTION OF DRAWINGS

Like reference symbols in the various drawings indicate like elements.

DETAILED DESCRIPTION

Figure 1:
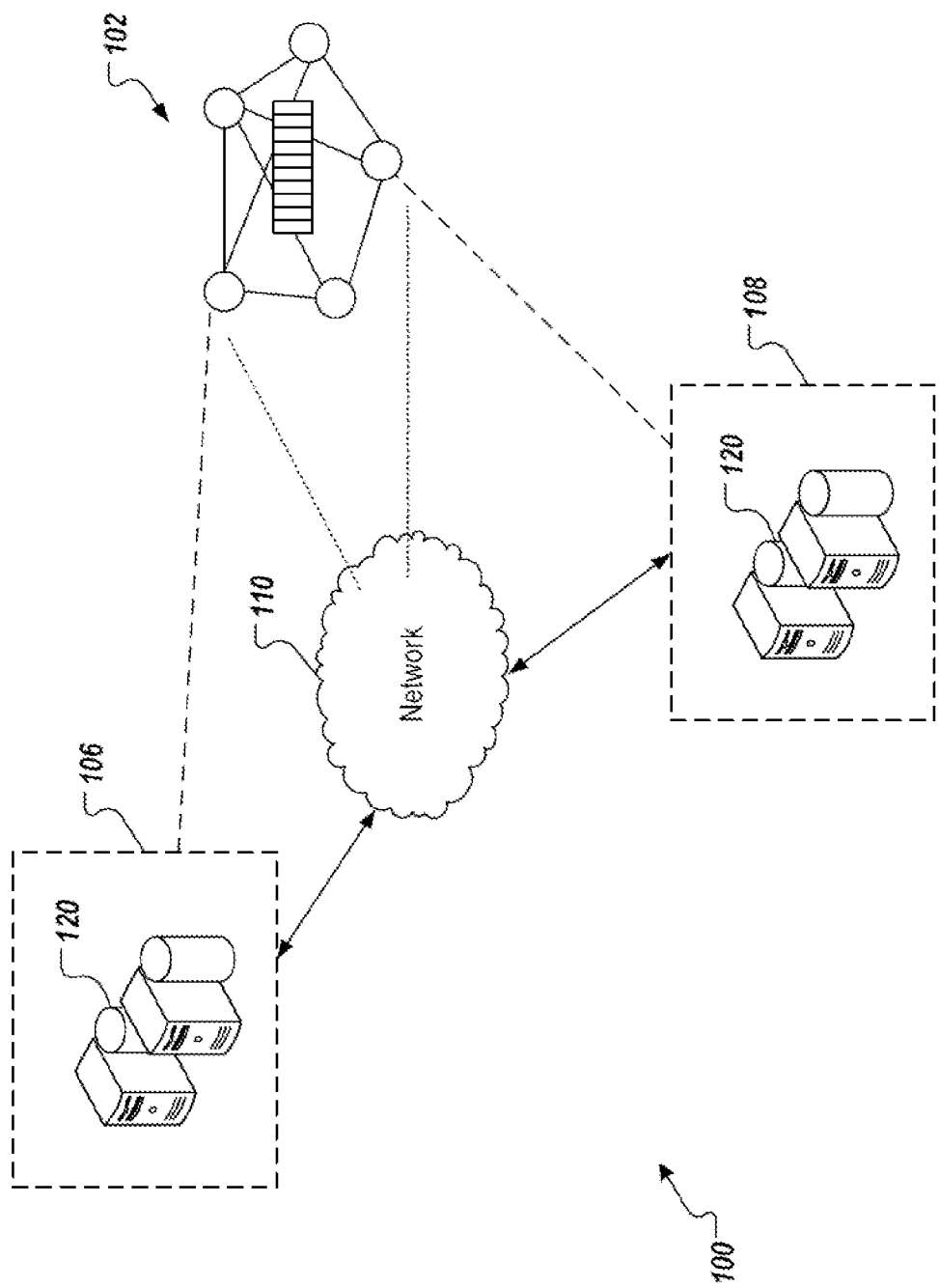
FIG. 1 depicts an example of an environment that can be used to execute implementations of the present specification.

Implementations of the present specification include computer-implemented methods for data isolation in a blockchain network. More particularly, implementations of the present specification are directed to isolating private transaction details while publishing transaction summaries to a private blockchain and account balance updates to a public blockchain. In some implementations, actions include receiving a request to perform a private transaction associated with at least one account; in response to receiving the request, performing, by a workflow node, the private transaction; in response to performing the private transaction, generating, by the workflow node, a representation of the private transaction configured to be accessible only to entities that are authorized to access the private transaction; storing, in a private blockchain, the representation of the private transaction; generating, by the workflow node, an account record for the at least one account associated with the private transaction based at least in part on the private transaction, wherein the account record is configured to be accessible to at least one entity that is not authorized to access the representation of the private transaction in the private blockchain; and storing, in a public blockchain, the account record.

To provide further context for implementations of the present specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with crypto-currency networks, blockchain is used herein to generally refer to a DLS without reference to any particular use case.

A blockchain is a data structure that stores transactions in a way that the transactions are immutable, and can be subsequently verified. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a data structure for storing transactions, a blockchain network is a network of computing nodes that manage, update, and maintain one or more blockchains. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Examples of public blockchain networks include crypto-currency networks, which are a peer-to-peer payment network. As noted above, the term blockchain, however, is used to generally refer to distributed ledgers without particular reference to any particular blockchain network In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. Examples of consensus protocols include, without limitation, proof-of-work (POW) (e.g., implemented in the some crypto-currency networks), proof-of-stake (POS), and proof-of-authority (POA). POW is referenced further herein as a non-limiting example.

In general, a private blockchain network private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present specification are described in further detail herein with reference to a public blockchain network, which is public among the participating entities. It is contemplated, however, that implementations of the present specification can be realized in any appropriate type of blockchain network.

Implementations of the present specification are described in further detail herein in view of the above context. More particularly, and as introduced above, implementations of the present specification are directed to isolation of sensitive transaction data in a blockchain network.

In a conventional blockchain network, transactions that are recorded in the blockchain are publicly available. However, in many financial scenarios, the details of such transactions include sensitive information that the transaction participants do not wish to make public. For example, a participant in the blockchain network may want to hide its transactions from a competing entity also participating in the blockchain network.

The techniques described herein provide a technical solution to the technical problem of data isolation in a blockchain network. For example, transaction detail data can be locally stored by workflow nodes in the blockchain network, and verified through out-of-chain collaboration. Selected information from the transaction detail data (e.g., the participants in the transaction) can be stored in a private blockchain accessible only to the workflow nodes. Account statuses (e.g., balances) for the participants can be stored in a public blockchain for inspection and verification by all network participants, and can be updated as new transactions are processed.

FIG. 1 depicts an example of an environment 100 that can be used to execute implementations of the present specification. In some examples, the example environment 100 enables entities to participate in a blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In general the network 110 represents one or more communication networks. In some cases, the computing devices 106, 108 can be nodes of a cloud computing system (not shown), or can each computing device 106, 108 be a separate cloud computing system including a plurality of computers interconnected by a network and functioning as a distributed processing system.

In the depicted example, the computing systems 106, 108 can each include any appropriate computing system that enables participation as a node in the blockchain network 102. Example computing devices include, without limitation, a server, a desktop computer, a laptop computer, a tablet computing device, and a smartphone. In some examples, the computing systems 106, 108 hosts one or more computer-implemented services for interacting with the blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the blockchain network 102 is represented as a peer-to-peer network of nodes, and the computing systems 106, 108 provide nodes of the first entity, and second entity respectively, which participate in the blockchain network 102.

Figure 2:
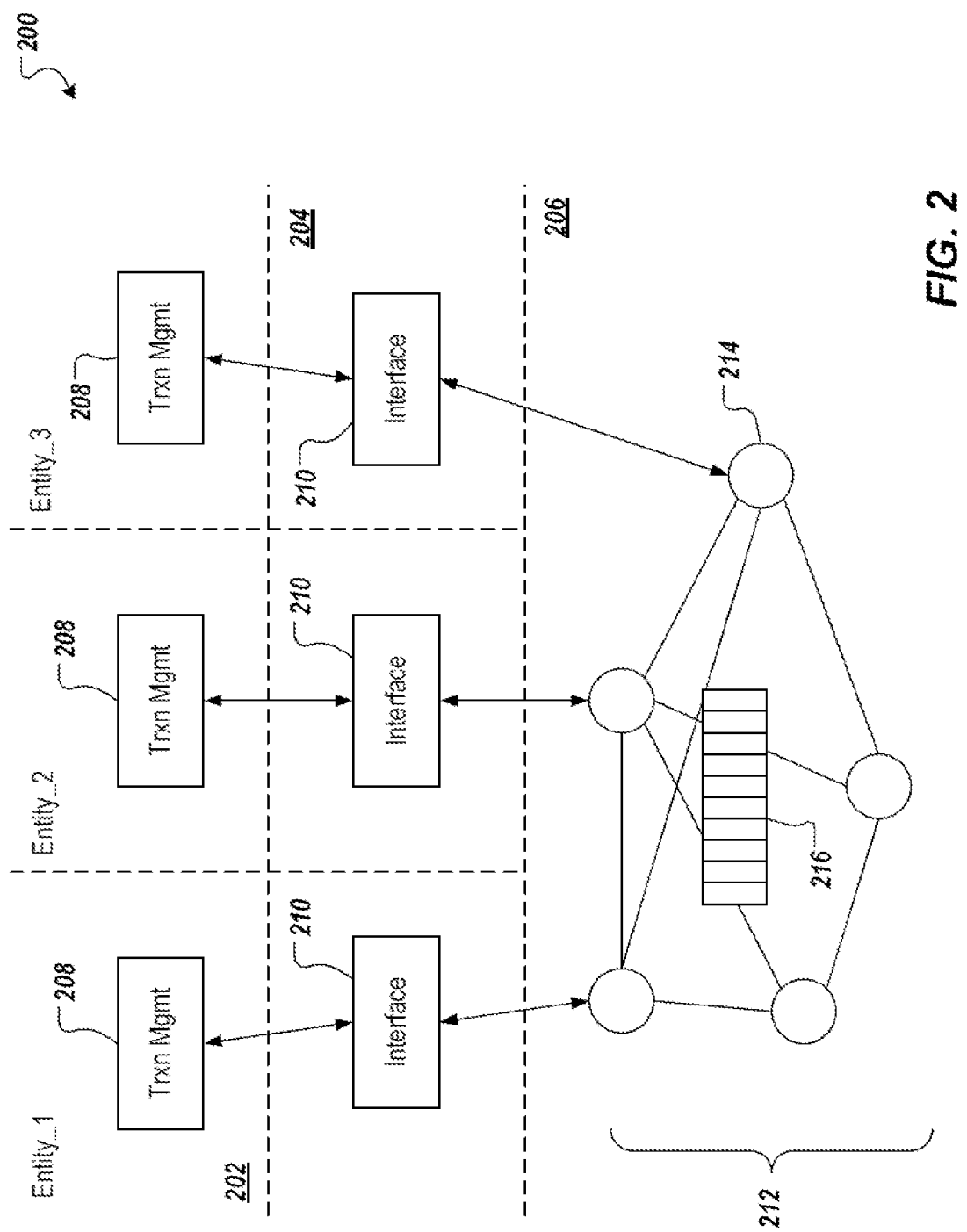
FIG. 2 depicts an example of an architecture in accordance with implementations of the present specification.

FIG. 2 depicts an example of an architecture 200 in accordance with implementations of the present specification. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the blockchain network.

Figure 3:
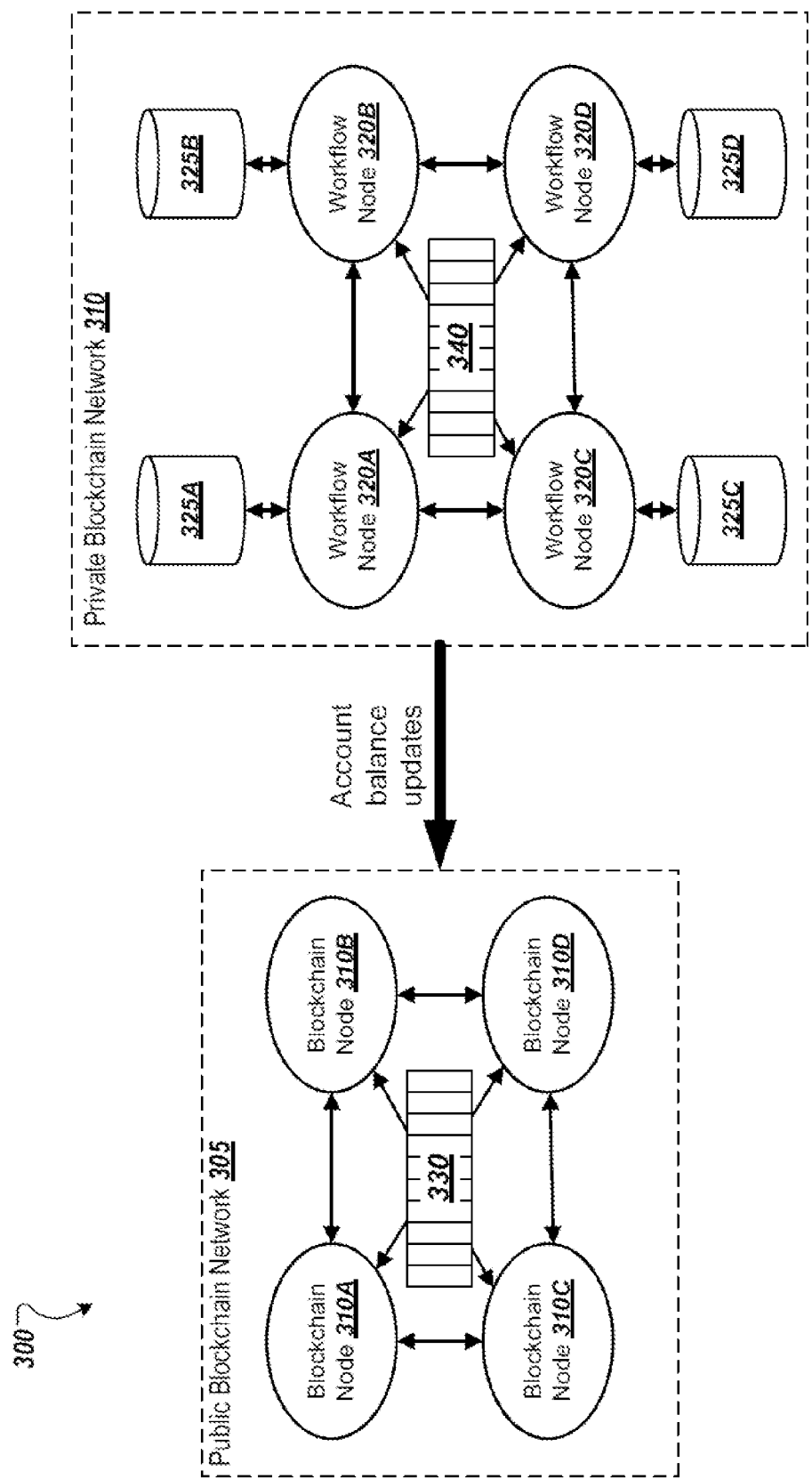
FIG. 3 depicts an example of a system for providing data isolation in a blockchain network in accordance with implementations of the present specification.

FIG. 3 depicts an example of a system 300 for providing data isolation in a blockchain network in accordance with implementations of the present specification. As shown, the system 300 includes a public blockchain network 305 including blockchain nodes 310A-D maintaining a public blockchain 330. System 300 further includes a private blockchain network 310 including workflow nodes 320A-D. Each workflow node 320A-D is associated with a local storage device 325A-D. The workflow nodes 320A-D maintain a private blockchain 340 separate from the public blockchain 330. In some implementations, the workflow nodes 320A-D may also function as blockchain nodes of the public blockchain network 305 by participating in the creation and verification of new blocks to be added to the public blockchain 330.

In operation, the workflow nodes 320A-D receive private transactions to be performed and stored in the system 300. In some cases, a client of the system 300 may submit a transaction to one of the blockchain nodes 310A-D or the workflow nodes 320A-D. In some cases, the transaction may be between two or more entities that operate one or more of the blockchain nodes 310A-D or the workflow nodes 320A-

D, in which case the transaction may be received from one or more of these participant entities at a controlled workflow node. In some implementations, the blockchain nodes 310A-D may be configured to forward new transactions to the workflow nodes 320A-D for processing rather than recording them in the public blockchain 330.

In some implementations, each workflow node 320A-D stores received transaction data in its local storage 325A-D. In some implementations, the local storage 325A-D may be storage devices coupled to the associated workflow node 320A-D, such as, for example, hard drives, random access memory (RAM), flash memory, or other storage devices. In some cases, local storage 325A-D may store shards of a distributed database maintained by the workflow nodes 320A-D.

In some implementations, when a workflow node (e.g., 320A) receives a new transaction, the workflow node 320A verifies the transaction (described in greater detail below), and performs any actions associated with the transaction that it is responsible for (e.g., debiting and credit accounts at the participant financial institutions, executing smart contract instructions, etc.). In some cases, the workflow node 320A generates a representation of the private transaction for storage in the private blockchain 340. For example, the workflow node 320A may generate a representation of the transaction including a hash of the transaction data, and the identities of all transaction participants. In some implementations, each private transaction will be cryptographically signed by all transaction participants. The workflow node 320A can include these digital signatures in the representation of the private transaction stored in the private blockchain 340. The workflow 320A may also store the raw private transaction data in its local storage 325A. By organizing the transaction data in this manner, sensitive transaction data (e.g., the amounts associated with the transaction) can be stored locally by the workflow nodes 320A-D and thus kept secret, while the private blockchain 340 can serve as the consensus record of all private transactions in the system. In some implementations, the private transaction data is stored in the local storage 325A-D of workflow nodes 320A-D that are controlled by the entities participating in the transaction, thus isolating the private transaction data from other entities. In some cases, the workflow nodes 320A-D maintain the private blockchain 340 according to conventional consensus methods.

In some implementations, the workflow node 320A, after performing the above-described actions on the private blockchain network 310, the workflow node 320*a* generates account records for the participants in the private transaction for inclusion in the public blockchain 330. The account records include updated balances for the accounts of the participants in the private transaction after the private transaction has been performed. For example, if workflow node 320A received a private transaction where account A transferred $10 to account B, workflow node 320A could generate an account record debiting account A's balance by $10, and another account record crediting account B's balance by $10. The generated account records can be sent to the public blockchain network 305 for inclusion in the public blockchain 330, such as by the workflow node 320A broadcasting the account records to the blockchain nodes 310A-D.

In some implementations, the workflow node 320A may be configured to wait until a certain number of transactions have been performed involving a particular entity before updating the entity's account balance on the public blockchain 330. For example, the workflow node 320A may publish a new account record and balance for account A only after processing three transactions involving account A. Delaying the account balance updates may prevent an observer from deducing transaction details based on the changes in the account balances. For example, if the system were to update the account balance after each transaction, an observer could deduce that account A paid account B $10 by noting that account A's balance was debited by $10 and account B's balance was credited by the same amount. By making each account balance update reflect changes made by multiple transactions, the individual transaction details become more difficult to deduce.

Figure 4:
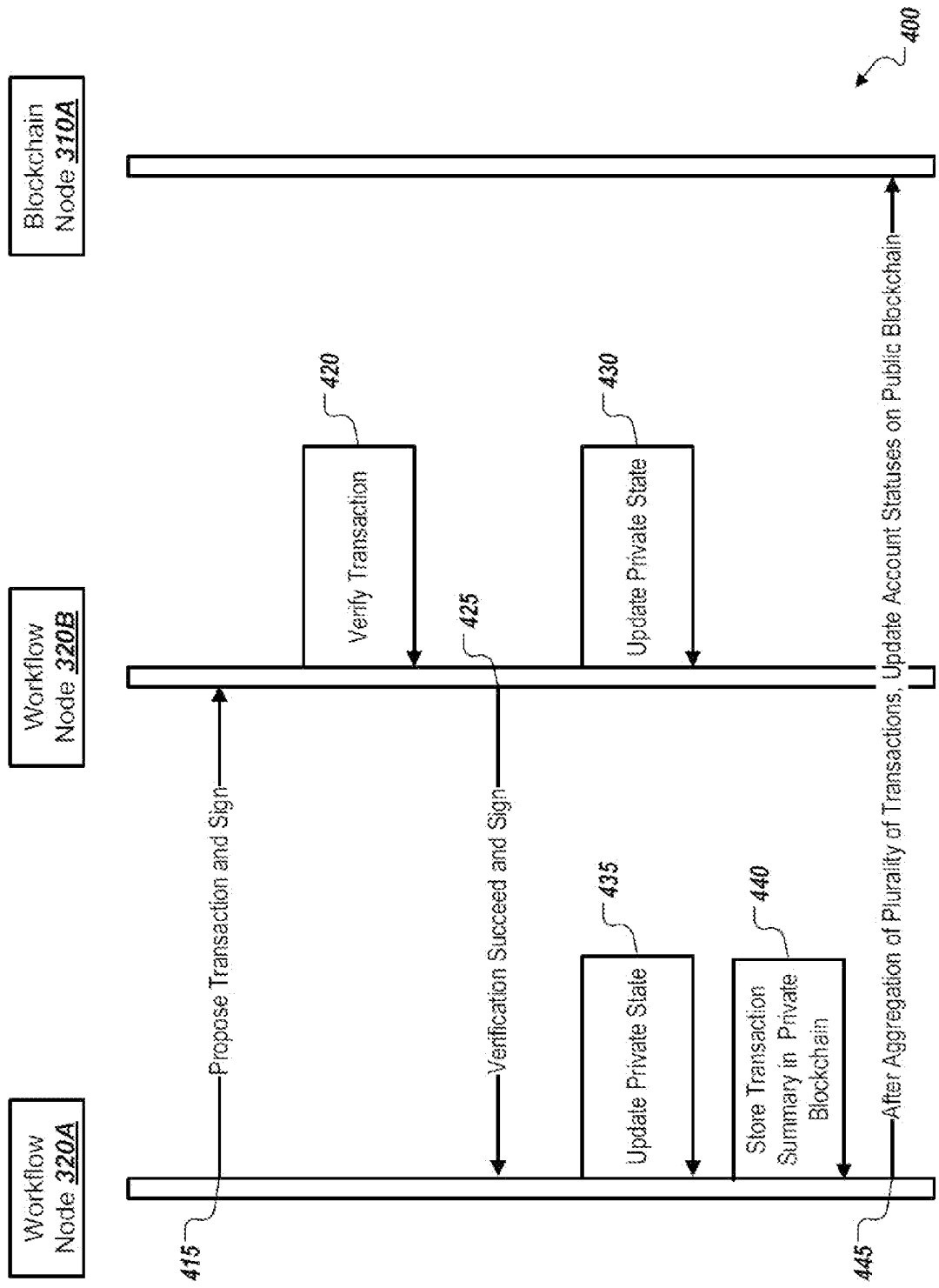
FIG. 4 depicts an example of a process for providing data isolation in a blockchain network in accordance with implementations of the present specification.

FIG. 4 depicts an example of a process 400 for providing data isolation in a blockchain network in accordance with implementations of the present specification. As shown, the process involves workflow nodes 320A and 320B, and blockchain node 310A from FIG. 3. At 415, workflow node 320A proposes a private transaction to workflow node 320B. For example, the private transaction may be a transaction between the entity controlling workflow node 320A and the entity controlling workflow node 320B. In some cases, workflow node 320A cryptographically signs the proposed transaction so the workflow node 320B can verify that identity of the entity proposing the transaction.

At 420, the workflow node 320B verifies the proposed transaction using its private state and/or the private blockchain 340. For example, the workflow node 320B may verify that the account associated with the workflow node 320A has sufficient funds to cover the transaction; that the account is the owner of assets (e.g., currency) to be transferred; or other information about the private transaction.

At 425, the workflow node 320B notifies the workflow node 320A that the transaction has been successfully verified, and returns its digital signature to prove its identity. At 430 and 435, the workflow nodes 320A, B update their respective private states (e.g., local storage 325A, B) to include the agreed-upon private transaction. At 440, the workflow node 320A stores a representation of the private transaction in the private blockchain 340, as described above.

At 445, the workflow node 320A updates the status of the accounts (by generating account records, as described above) associated with workflow nodes 320A and 320B by sending a notification to blockchain node 310A, which will store the updates in the public blockchain 330. As previously discussed, the workflow node 320A may be configured to provide account balance updates after a certain number of private transactions have been processed for the transaction participants in order to prevent observers from deducing the transaction details from the account balance updates.

Figure 5:
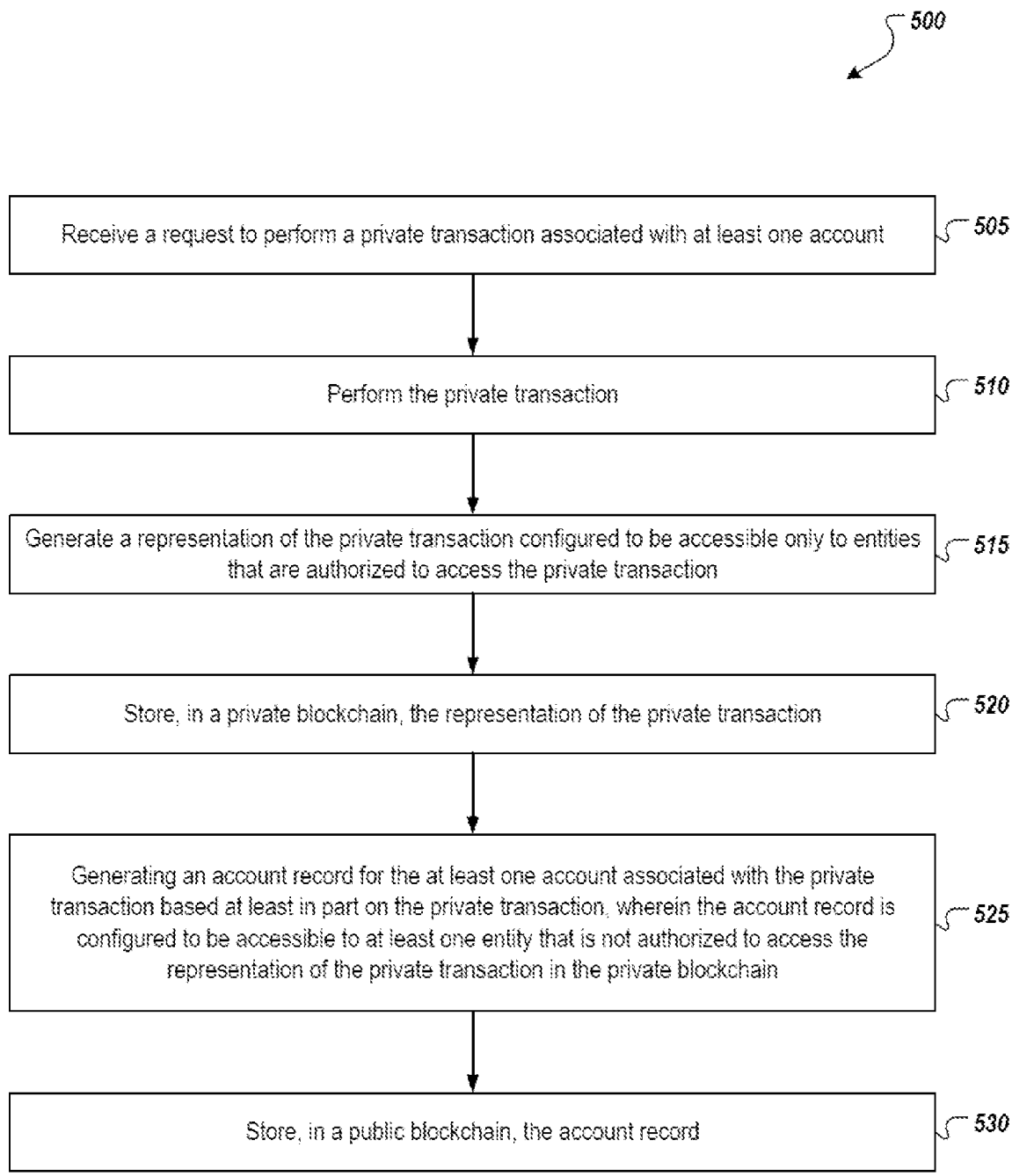
FIG. 5 depicts an example of a process that can be executed in accordance with implementations of the present specification.

FIG. 5 depicts an example of a process 500 that can be executed in accordance with implementations of the present specification. In some implementations, the example process 500 may be performed using one or more computer-executable programs executed using one or more computing devices.

At 505, a request to perform a private transaction associated with at least one account is received by a workflow node.

At 510, in response to receiving the request, the workflow node performs the requested private transaction.

At 515, in response to performing the private transaction, the workflow node generates a representation of the private transaction configured to be accessible only to entities that are authorized to access the private transaction.

At 520, the representation of the private transaction is stored in a private blockchain. In some cases, the workflow node stores the private transaction in a datastore of the workflow node, wherein the datastore is separate from the private blockchain, and generating the representation of the private transaction includes generating a hash value associated with the private transaction.

At 525, the workflow node generates an account record for the at least one account associated with the private transaction based at least in part on the private transaction, wherein the account record is configured to be accessible to at least one entity that is not authorized to access the representation of the private transaction in the private blockchain. In some implementations, the workflow node maintains a local representation of the account record for the at least one account, performing the private transaction comprises modifying the local representation of the account record based on the private transaction, and the at least one account record includes a subset of information in the local representation of the account record. In some cases, the account record includes a balance of the at least one account and the account record does not include information about the associated private transaction.

At 530, the account record is stored in a public blockchain. In some cases, storing the account records to the public blockchain is performed responsive to storing the representation of the private transaction to the private blockchain.

In some implementations, other representations of private transactions for which no corresponding storage of an account to the public blockchain is performed are stored in the private blockchain.

In some cases, an encrypted copy of the private transaction that has been encrypted with a public key of a public/private keypair is stored in a datastore separate from the private blockchain, In some implementations, the private blockchain is a first private blockchain, the private transaction is a first private transaction, and the method further comprises: storing, in a second private blockchain separate from the first private blockchain, a representation of a second private transaction different from the first private transaction; and storing, in the public blockchain, an account record for an account associated with the second private transaction.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will be coupled to at least one non-transitory computer-readable storage medium (also referred to as a computer-readable memory). The storage medium coupled to the computer can be an internal component of the computer (e.g., an integrated hard drive) or an external component (e.g., universal serial bus (USB) hard drive or a storage system accessed over a network). Examples of storage media can include, for example, magnetic, magneto-optical, or optical disks, solid state drives, network storage resources such as cloud storage systems, or other types of storage media. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for protecting sensitive data stored on a blockchain, the method comprising:
   receiving a request to perform a private transaction associated with at least one account;
   in response to receiving the request, performing, by a workflow node, the private transaction;
   in response to performing the private transaction, generating, by the workflow node, a representation of the private transaction configured to be accessible only to entities that are authorized to access the private transaction, the representation of the private transaction including an identity of a transaction participant associated with the at least one account;
   storing, in a private blockchain, the representation of the private transaction;
   generating, by the workflow node, an account record for the at least one account associated with the private transaction based at least in part on the private transaction, wherein the account record is configured to be accessible to at least one entity that is not authorized to access the representation of the private transaction in the private blockchain, the account record comprising an updated balance of the transaction participant associated with the at least one account; and
   storing, in a public blockchain, the account record.

2. The computer-implemented method of claim 1, the method further comprising:
   storing, by the workflow node, the private transaction in a datastore of the workflow node, wherein the datastore is separate from the private blockchain, and
   wherein generating the representation of the private transaction includes generating a hash value associated with the private transaction.

3. The computer-implemented method of claim 1, the method further comprising:
   maintaining, by the workflow node, a local representation of the account record for the at least one account;
   wherein performing the private transaction comprises modifying the local representation of the account record based on the private transaction; and
   wherein the at least one account record includes a subset of information in the local representation of the account record.

4. The computer-implemented method of claim 1, wherein storing the account record in the public blockchain is performed responsive to storing the representation of the private transaction in the private blockchain.

5. The computer-implemented method of claim 1, the method further comprising storing, to the private blockchain, other representations of private transactions for which no corresponding storage of an account to the public blockchain is performed.

6. The computer-implemented method of claim 1, the method further comprising:

storing, in a datastore separate from the private blockchain, an encrypted copy of the private transaction that has been encrypted with a public key of a public/private keypair.

7. The computer-implemented method of claim 6, wherein storing the encrypted copy of the private transaction includes storing a signature of the encrypted copy that has been created with a private key of the public/private keypair.

8. The computer-implemented method of claim 1, wherein the private blockchain is a first private blockchain, the private transaction is a first private transaction, and the method further comprises:
    storing, in a second private blockchain separate from the first private blockchain, a representation of a second private transaction different from the first private transaction;
    comparing, by the workflow node, a quantity of private transactions performed to a threshold representing a predetermined quantity of private transactions;
    determining, by the workflow node and based on the result of comparing the quantity of private transactions to the threshold, that an account record for an account associated with the second private transaction can be stored in the public blockchain; and
    storing, in the public blockchain, the account record for the account associated with the second private transaction.

9. The computer-implemented method of claim 1, wherein the account record includes a balance of the at least one account and wherein the account record does not include information about the associated private transaction.

10. A non-transitory computer-readable storage medium storing one or more instructions executable by a computer system to perform operations comprising:
    receiving a request to perform a private transaction associated with at least one account;
    in response to receiving the request, performing, by a workflow node, the private transaction;
    in response to performing the private transaction, generating, by the workflow node, a representation of the private transaction configured to be accessible only to entities that are authorized to access the private transaction, the representation of the private transaction including an identity of a transaction participant associated with the at least one account;
    storing, in a private blockchain, the representation of the private transaction;
    generating, by the workflow node, an account record for the at least one account associated with the private transaction based at least in part on the private transaction, wherein the account record is configured to be accessible to at least one entity that is not authorized to access the representation of the private transaction in the private blockchain, the account record comprising an updated balance of the transaction participant associated with the at least one account; and
    storing, in a public blockchain, the account record.

11. The non-transitory computer-readable medium of claim 10, to the operations further comprising:
    storing, by the workflow node, the private transaction in a datastore of the workflow node, wherein the datastore is separate from the private blockchain, and wherein generating the representation of the private transaction includes generating a hash value associated with the private transaction.

12. The non-transitory computer-readable medium of claim 10, the operations further comprising:
    maintaining, by the workflow node, a local representation of the account record for the at least one account;
    wherein performing the private transaction comprises modifying the local representation of the account record based on the private transaction; and
    wherein the at least one account record includes a subset of information in the local representation of the account record.

13. The non-transitory computer-readable medium of claim 10, wherein storing the account record in the public blockchain is performed responsive to storing the representation of the private transaction in the private blockchain.

14. The non-transitory computer-readable medium of claim 10, the operations further comprising storing, to the private blockchain, other representations of private transactions for which no corresponding storage of an account to the public blockchain is performed.

15. The non-transitory computer-readable medium of claim 10, the operations further comprising:
    storing, in a datastore separate from the private blockchain, an encrypted copy of the private transaction that has been encrypted with a public key of a public/private keypair.

16. The non-transitory computer-readable medium of claim 15, wherein storing the encrypted copy of the private transaction includes storing a signature of the encrypted copy that has been created with a private key of the public/private keypair.

17. The non-transitory computer-readable medium of claim 10, wherein the private blockchain is a first private blockchain, the private transaction is a first private transaction, and the operations further comprise:
    storing, in a second private blockchain separate from the first private blockchain, a representation of a second private transaction different from the first private transaction;
    comparing, by the workflow node, a quantity of private transactions performed to a threshold representing a predetermined quantity of private transactions;
    determining, by the workflow node and based on the result of comparing the quantity of private transactions to the threshold, that an account record for an account associated with the second private transaction can be stored in the public blockchain; and
    storing, in the public blockchain, the account record for the account associated with the second private transaction.

18. The non-transitory computer-readable medium of claim 10, wherein the account record includes a balance of the at least one account and wherein the account record does not include information about the associated private transaction.

19. A system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        receiving a request to perform a private transaction associated with at least one account;
        in response to receiving the request, performing, by a workflow node, the private transaction;
        in response to performing the private transaction, generating, by the workflow node, a representation of the private transaction configured to be accessible only to entities that are authorized to access the private transaction, the representation of the private transaction including an identity of a transaction participant associated with the at least one account;

storing, in a private blockchain, the representation of the private transaction;

generating, by the workflow node, an account record for the at least one account associated with the private transaction based at least in part on the private transaction, wherein the account record is configured to be accessible to at least one entity that is not authorized to access the representation of the private transaction in the private blockchain, the account record comprising an updated balance of the transaction participant associated with the at least one account; and storing, in a public blockchain, the account record.

20. The system of claim 19, wherein the operations further comprise:

storing, by the workflow node, the private transaction in a datastore of the workflow node, wherein the datastore is separate from the private blockchain, and wherein generating the representation of the private transaction includes generating a hash value associated with the private transaction.

21. The system of claim 19, wherein the operations further comprise:

maintaining, by the workflow node, a local representation of the account record for the at least one account;

wherein performing the private transaction comprises modifying the local representation of the account record based on the private transaction; and wherein the at least one account record includes a subset of information in the local representation of the account record.

22. The system of claim 19, wherein storing the account record in the public blockchain is performed responsive to storing the representation of the private transaction in the private blockchain.

23. The system of claim 19, wherein the operations further comprise storing, to the private blockchain, other representations of private transactions for which no corresponding storage of an account to the public blockchain is performed.

24. The system of claim 19, wherein the operations further comprise:

storing, in a datastore separate from the private blockchain, an encrypted copy of the private transaction that has been encrypted with a public key of a public/private keypair.

25. The system of claim 24, wherein storing the encrypted copy of the private transaction includes storing a signature of the encrypted copy that has been created with a private key of the public/private keypair.

26. The system of claim 19, wherein the private blockchain is a first private blockchain, the private transaction is a first private transaction, and the operations further comprise:

storing, in a second private blockchain separate from the first private blockchain, a representation of a second private transaction different from the first private transaction;

comparing, by the workflow node, a quantity of private transactions performed to a threshold representing a predetermined quantity of private transactions;

determining, by the workflow node and based on the result of comparing the quantity of private transactions to the threshold, that an account record for an account associated with the second private transaction can be stored in the public blockchain; and storing, in the public blockchain, the account record for the account associated with the second private transaction.

27. The system of claim 19, wherein the account record includes a balance of the at least one account and wherein the account record does not include information about the associated private transaction.

* * * * *